US007620644B2

(12) United States Patent
Cote et al.

(10) Patent No.: US 7,620,644 B2
(45) Date of Patent: Nov. 17, 2009

(54) REENTRANT DATABASE OBJECT WIZARD

(75) Inventors: Antoine Cote, Redmond, WA (US); Paul J Yuknewicz, Redmond, WA (US); Steven M Lasker, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 10/968,437

(22) Filed: Oct. 19, 2004

(65) Prior Publication Data

US 2006/0085380 A1 Apr. 20, 2006

(51) Int. Cl.
*G06F 7/00* (2006.01)
(52) U.S. Cl. .............. 707/101; 707/102; 707/201; 717/105; 717/109; 717/113
(58) Field of Classification Search ................ 707/203, 707/102, 100, 101, 201, 202
See application file for complete search history.

(56) References Cited

U.S. PATENT DOCUMENTS

| 6,278,452 | B1* | 8/2001 | Huberman et al. .......... 715/764 |
| 2003/0108038 | A1* | 6/2003 | Devanagondi et al. ...... 370/389 |
| 2003/0172368 | A1* | 9/2003 | Alumbaugh et al. ........ 717/106 |
| 2003/0212647 | A1* | 11/2003 | Bangel et al. ................. 707/1 |
| 2004/0133610 | A1* | 7/2004 | Flam et al. ................ 707/200 |
| 2005/0071359 | A1* | 3/2005 | Elandassery et al. ........ 707/102 |
| 2005/0114833 | A1* | 5/2005 | Bates et al. ................. 717/110 |
| 2005/0149582 | A1* | 7/2005 | Wissmann et al. .......... 707/201 |
| 2005/0149583 | A1* | 7/2005 | Baskaran et al. ............ 707/203 |

OTHER PUBLICATIONS

Steve Lasker, Drag-Once Databinding, CoDe Magazine, Sep.-Oct., 2004, 19 pages.

* cited by examiner

*Primary Examiner*—Isaac M Woo
*Assistant Examiner*—Amy Ng
(74) *Attorney, Agent, or Firm*—Workman Nydegger

(57) ABSTRACT

A system and method for a reentrant database object wizard is provided. The system provides the ability to compare a currently generated dataset to the objects of the underlying database. Columns and tables that are not common between both the dataset and the database are visually displayed for the user to make a decision on inclusion or exclusion. The system includes a comparison that provides comparison information based upon a comparison of a dataset to an associated database and a display component that displays the comparison information. The system further includes an input component which provides information associated with the user's decision on inclusion and/or exclusion of column(s) and/or table (s) to the system. The system is reentrant thus providing long-term value to the developer over the application development cycle.

19 Claims, 16 Drawing Sheets

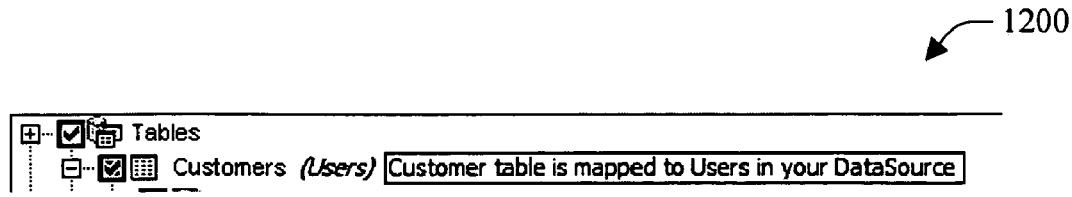
FIG. 12
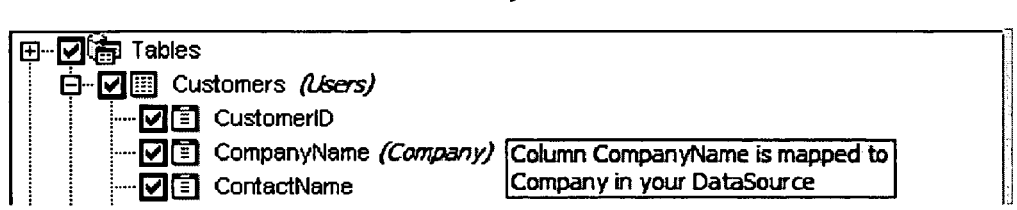
FIG. 13
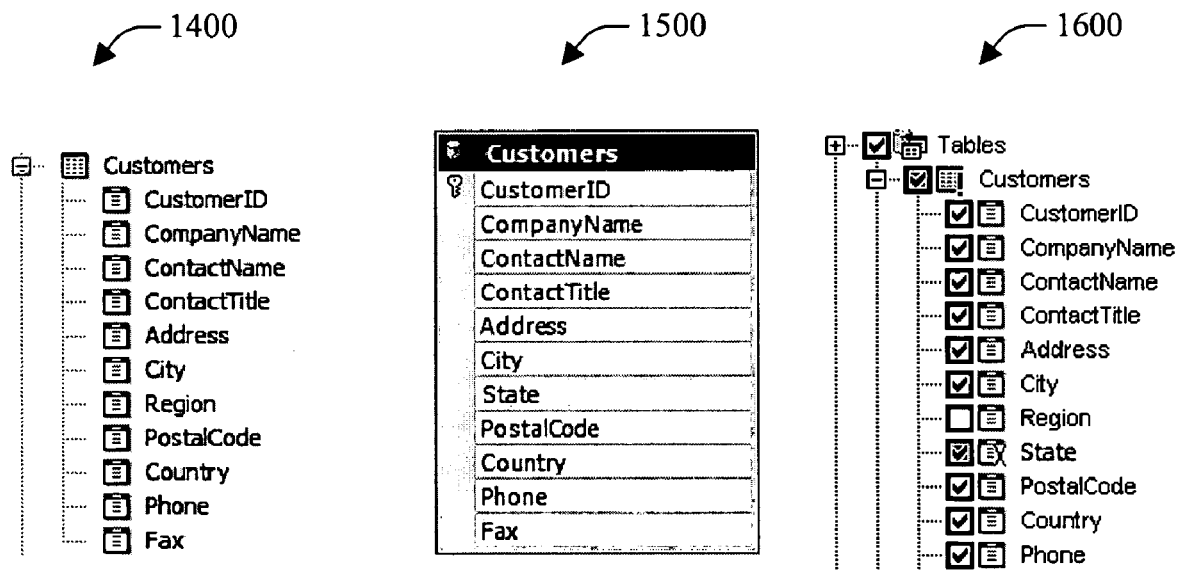
FIG. 14     FIG. 15     FIG. 16

REENTRANT DATABASE OBJECT WIZARD

TECHNICAL FIELD

The subject invention relates generally to software development tools, and more specifically, to a reentrant database object wizard.

BACKGROUND OF THE INVENTION

Software vendors are continually advancing the latest in development tools for users to take advantage of software made available to consumers. Typically, such tools require some level of familiarity by developer with the tool(s) language and structure in order to use the development tool(s) and develop the appropriate interface. However, the rapid evolution in which such development frameworks are manufactured and sold impact the speed with which such tools can be understood and used to provide the software for which they are created. Developers are still left spending an inordinate amount of time learning and struggling with the development environment in order to provide a suitable product for a customer.

Historically, application development has been an iterative process. Developer(s) begin the development process with a certain amount of known information regarding a database they need to work with within their application. The developer(s) build their database model (e.g., DataType) to reflect the known information. Thereafter, the developer(s) start consuming this model within their application. As their application and requirements evolve, developer(s) discover new elements of data that need to be added, changed or deleted from their database model. The developer is then faced with the challenge on how to synchronize the developer's application data model with the database data model.

SUMMARY OF THE INVENTION

The following presents a simplified summary of the subject invention in order to provide a basic understanding of some aspects of the subject invention. This summary is not an extensive overview of the subject invention. It is not intended to identify key/critical elements of the subject invention or to delineate the scope of the subject invention. Its sole purpose is to present some concepts of the subject invention in a simplified form as a prelude to the more detailed description that is presented later.

The subject invention provides for a reentrant database object wizard system and method. The system provides the ability to compare a currently generated Dataset to object(s) of the underlying database. Column(s) and/or table(s), if any, that are not common between both the dataset and the database are visually displayed for the user to make a decision on inclusion or exclusion. In addition, column(s) and/or table(s), if any, that were previously within the dataset that are no longer available on the database connection are displayed, for example, with warning icons so that the user can either resolve the missing column or table within the database, or remove the column/table from their typed dataset.

The system includes a comparison component and a display component. The comparison component provides comparison information based upon a comparison of a dataset to an associated database. The display component displays the comparison information. The system can further, optionally, include an input component which can be employed by a user to provide information associated with a user's decision on inclusion and/or exclusion of column(s) and/or table(s) of the dataset to the system. Thereafter, based upon the user's input, the system can provide based upon a comparison of the modified dataset to the associated database.

In accordance with an aspect of the present invention, the system is reentrant thus providing long-term value to the developer over the application development cycle. Additionally, in one example, a similar user interface for the initial phase (e.g., add new) and the reentrant phase is provided to the developer.

To the accomplishment of the foregoing and related ends, certain illustrative aspects of the subject invention are described herein in connection with the following description and the annexed drawings. These aspects are indicative, however, of but a few of the various ways in which the principles of the subject invention may be employed and the subject invention is intended to include all such aspects and their equivalents. Other advantages and novel features of the subject invention may become apparent from the following detailed description of the subject invention when considered in conjunction with the drawings.

BRIEF DESCRIPTION OF THE DRAWINGS

FIG. 12 is a diagram of an exemplary user interface in accordance with an aspect of the subject invention.

FIG. 13 is a diagram of an exemplary user interface in accordance with an aspect of the subject invention is illustrated.

FIG. 14 is a diagram of an exemplary database view in accordance with an aspect of the subject invention.

FIG. 15 is a diagram of an exemplary data source view in accordance with an aspect of the subject invention.

FIG. 16 is a diagram of an exemplary tree view in accordance with an aspect of the subject invention.

DETAILED DESCRIPTION OF THE INVENTION

Figure 1:
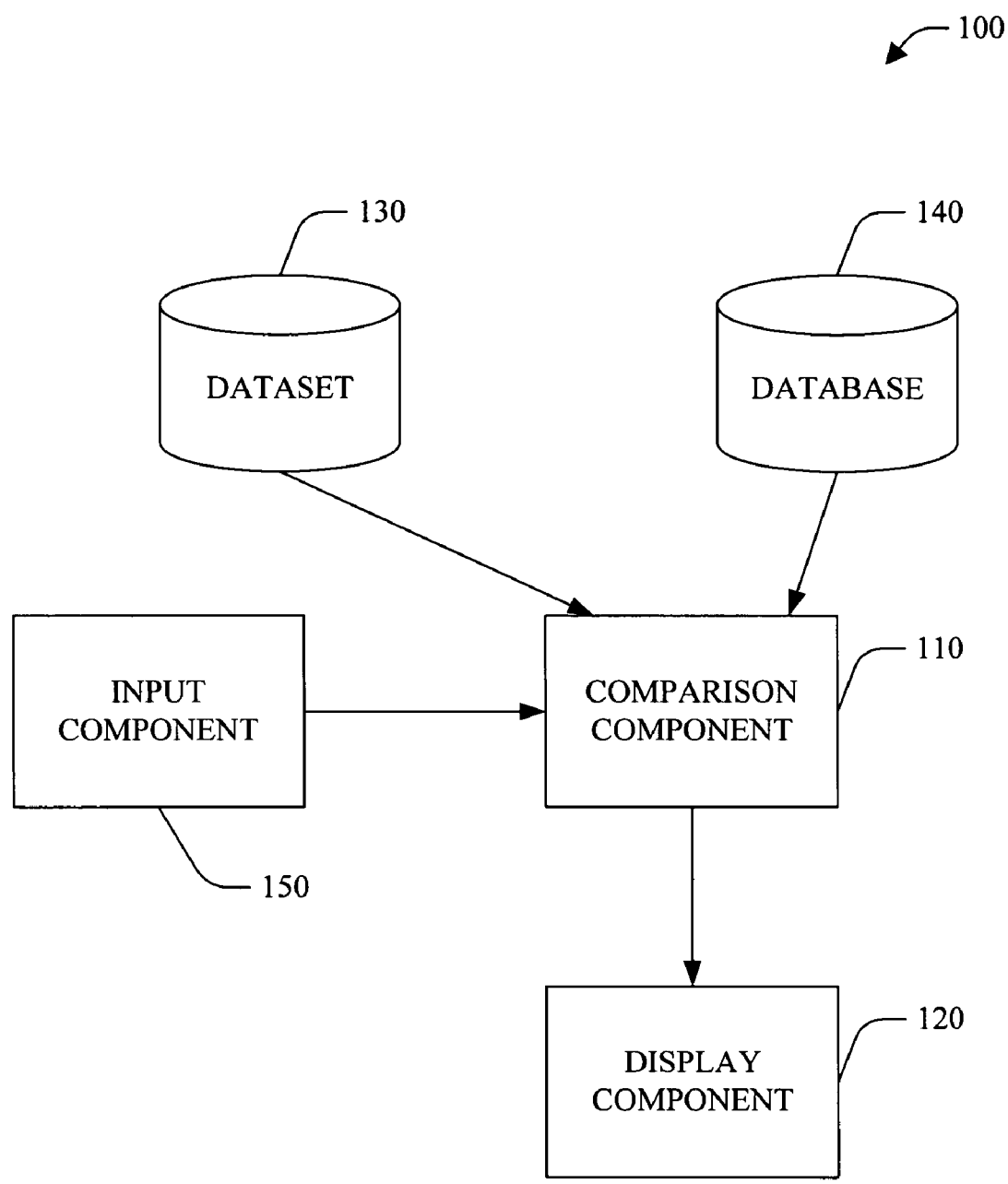
FIG. 1 is a block diagram of a reentrant database object wizard system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the subject invention.

Referring to FIG. 1, a reentrant database object wizard system 100 in accordance with an aspect of the subject invention is illustrated. The system 100 includes a comparison component 110 and a display component 120. The comparison component 110 provides comparison information based upon a comparison of a dataset 130 to an associated database 140. The display component 120 displays the comparison information. The system 100 can further, optionally, include an input component 150.

The system 100 can be employed to compare object(s) of a database 140 (e.g., table(s), view(s), stored procedure(s) and/or function(s)) to a Dataset 130. During the application development cycle, the system 100 can be reentered in order to identify difference(s), if any, between the database 140 and the Dataset 130. The system 100 enables editing scenarios of a selected dataset 130.

Thus, in one example, the system 100 enables developer(s) to quickly consume one or more objects in a database using an explicit Checkbox style wizard-like dialog. Editing a database reference results in a project dataset file. The project dataset can be immediately available for use in data binding, data sources window, user interface generation and/or in code intellisense.

The system 100 compares the Dataset 130 (e.g., currently generated) to object(s) of the underlying database 140. For example, column(s) and/or table(s) that are not common between both the dataset 130 and the database 140 are visually displayed via the display component 120 to a user. The user can then make a decision on inclusion and/or exclusion via the input component 150. Additionally, optionally, column(s) and/or table(s) that were previously within the Dataset 130 that are no longer available in the database 140 (e.g., via a database connection) are displayed, for example, with warning icon(s) so that the user can either resolve the missing column and/or table within the database 140 and/or remove the column and/or table from the typed dataset 130.

As noted previously, developer(s) generally work in an iterative style making changes to application(s). With the added complexity of databases evolving, application(s) frequently become out of sync with database(s) with which they interact. Conventionally, developer(s) generally manually kept track of difference(s) between their application DataType and its associated database.

The system 100 provides a mechanism for developer(s) to receive information regarding synchronization of an application's DataType and associated database. Utilizing the system 100, developer(s) are able to save time that can lead to increased productivity. Further, the system 100 can facilitate a more stable application as inconsistencies between DataType and associated database can be ascertained in a design-time environment.

Figure 2:
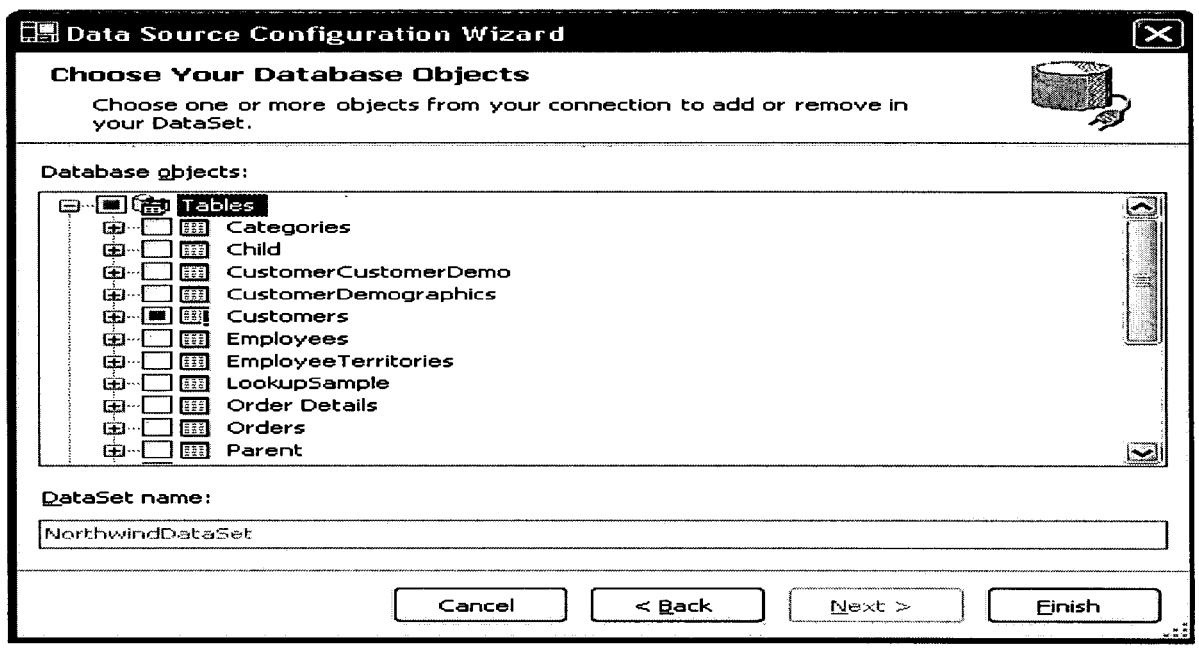
FIG. 2 is a diagram of an exemplary user interface in accordance with an aspect of the subject invention.

Referring briefly to FIG. 2, an exemplary user interface 200 in accordance with an aspect of the subject invention is illustrated. For example, the display component 120 can employ a wizard style interface to display the comparison information generated by the comparison component 110. For example, the comparison information can be displayed via the user interface 200—using table and/or column names in which a comparison is made and displayed in a hierarchical view (e.g., tree view) control. The user can toggle a tri-state checkbox for each table, and/or column to include/exclude the item within the Typed Dataset, or leave in its current state. Additionally, developer(s) can change the connection context to the database between comparisons (e.g., so they can compare their application between their development database and their production database).

Those skilled in the art will recognize while the subject invention has been described with respect to a database, the system 100 can be employed with configured and/or edit connection(s) to web service(s), object(s) and/or business object(s). The system 100 can thus be employed to edit an existing Data source, including exception handling when the Data source and the underlying object are out of synchronization.

Figure 3:
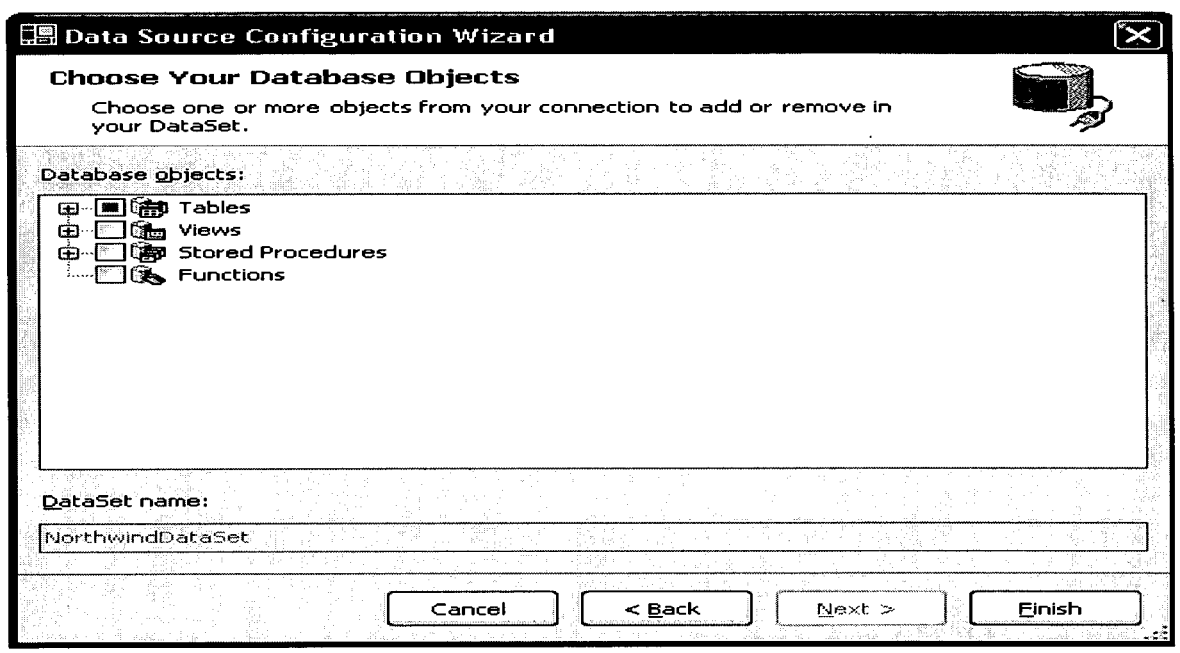
FIG. 3 is a diagram of an exemplary user interface in accordance with an aspect of the subject invention.

Referring briefly to FIG. 3, an exemplary user interface 300 in accordance with an aspect of the subject invention is illustrated. In one example, the system 100 is employed by a developer to add a data set that accesses a database (e.g., add to the project for the first time), for example, using the user interface 200. The developer creates a project and discovers a Data sources Window which indicates the developer can add data to the project. The developer clicks "Add New Data source", and selects Add from database. The developer then picks several fields from the related tables and also some stored procedures used to select historical data, and clicks Add. The developer sees immediate feedback that the developer has data—the dataset and its fields are visible in the Data sources Window and the dataset file is also visible in the project explorer. The developer can then use the Dataset in the developer's application.

Figure 4:
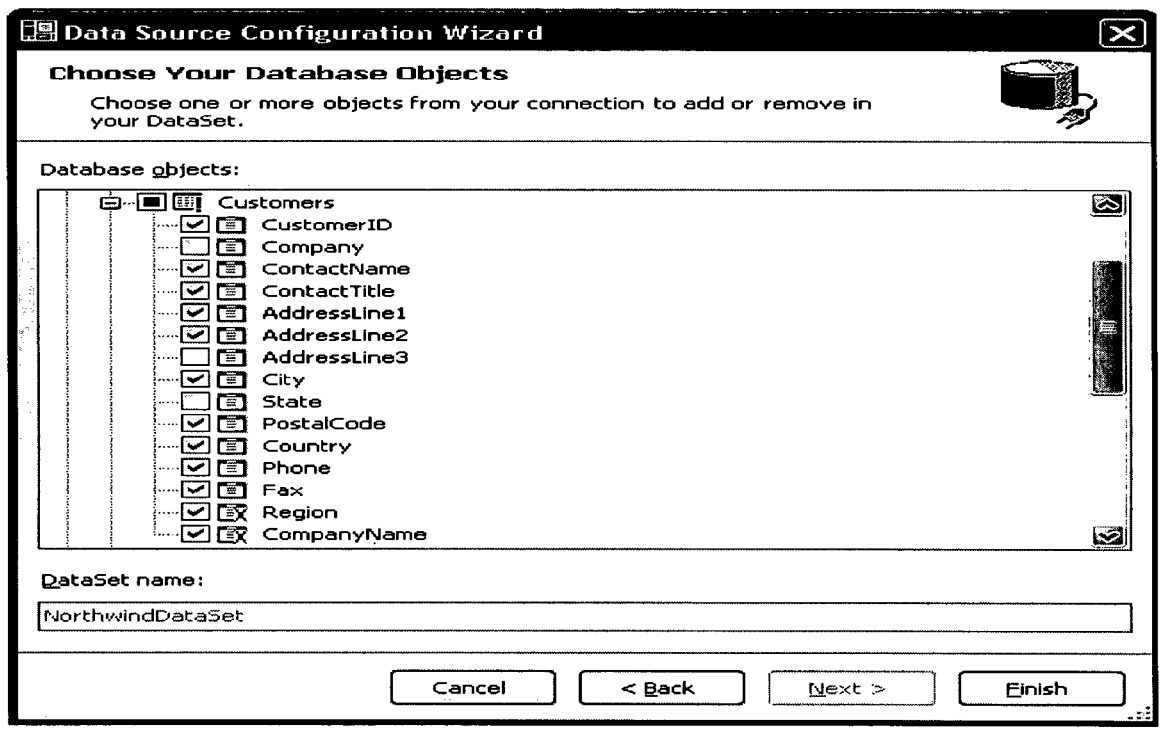
FIG. 4 is a diagram of an exemplary user interface in accordance with an aspect of the subject invention.

After working with the Dataset in the developer's application, the developer can once again invoke the system 100 to determine whether the Dataset 130 and the database 140 are in synch. The comparison component 110 compares the dataset 130 with the database 140 and provides comparison information to the display component 120. The display component provides 120 displays the comparison information to the developer, for example, via the user interface 200. The developer can make any necessary changes to the dataset 130 and/or a connection to the database 140 via the input component 150. Referring to FIG. 4, after the changes have been made, the system 100 can once again provide comparison information to the developer so that the developer can determine whether the dataset 130 and the database 140 are in synch via, for example, an exemplary user interface 400.

Optionally, the system 100 can be employed with a dataset 130 edited outside of the system 100. In addition to the developer changing the schema within their application, the underlying source may have changed from when the developer originally created the schema, and when the system 100 is invoked to re-configure the dataset 130.

Figure 5:
FIG. 5 is a diagram of an exemplary user interface in accordance with an aspect of the subject invention is illustrated.

Turning to FIG. 5, an exemplary user interface 500 in accordance with an aspect of the subject invention is illustrated. The user interface 500 welcomes the user (e.g., developer) to the data source configuration wizard.

Figure 6:
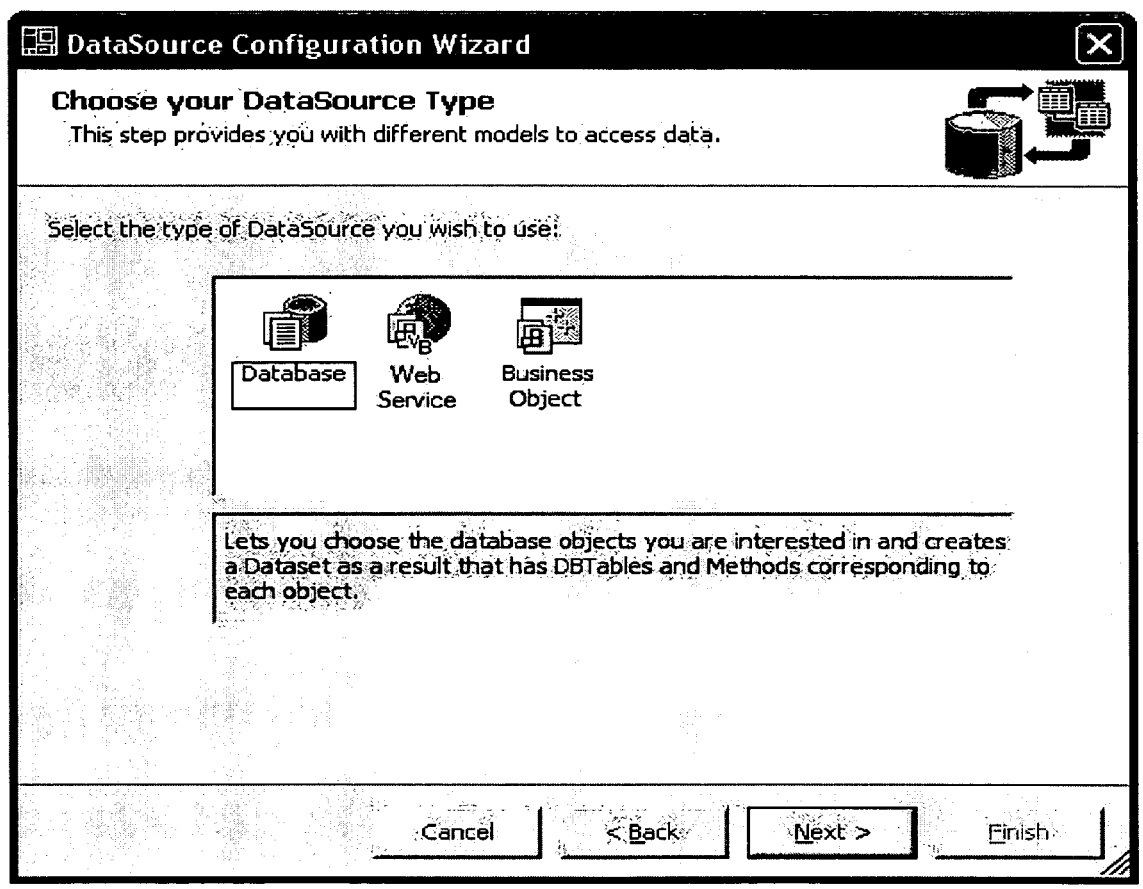
FIG. 6 is a diagram of a user interface in accordance with an aspect of the subject invention.
Figure 7:
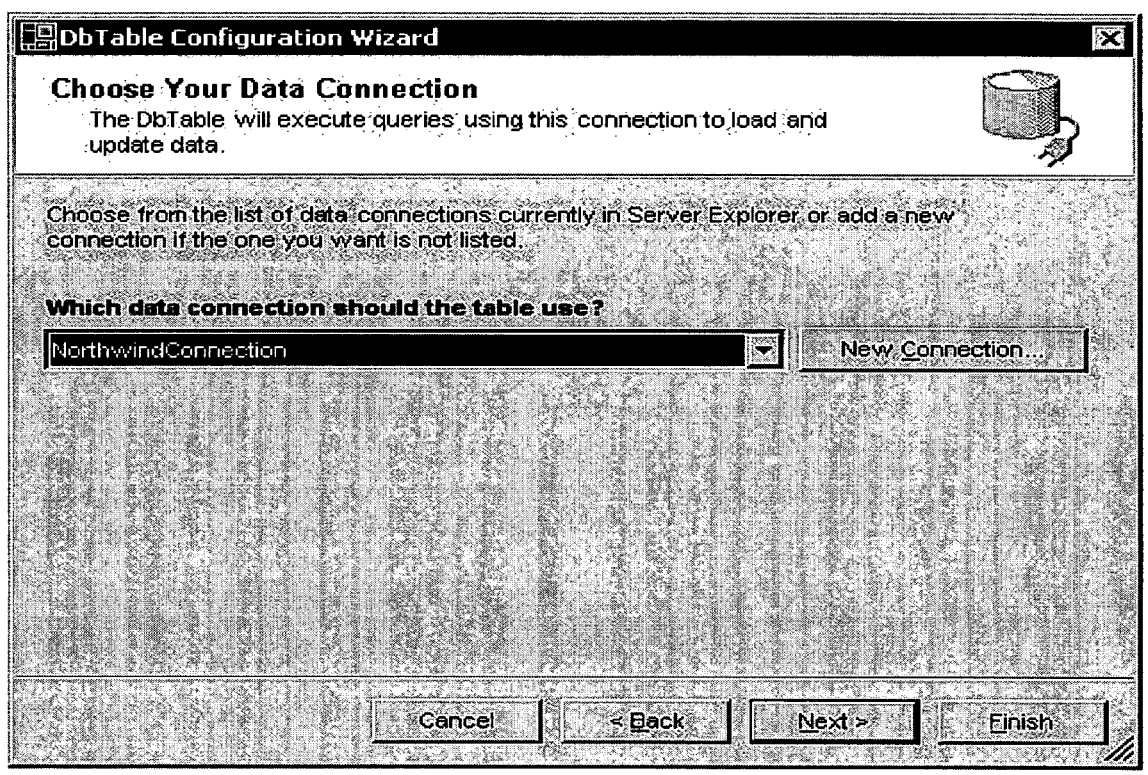
FIG. 7 is a diagram of an exemplary user interface in accordance with an aspect of the subject invention.

Next, referring to FIG. 6, a user interface 600 in accordance with an aspect of the subject invention. With the user interface 600, a user can select a data source for use with the wizard. In this example, a user has selected "database". Continuing with this example, a user can choose a data connection for the database via user interface 700 illustrated in FIG. 7.

Figure 8:
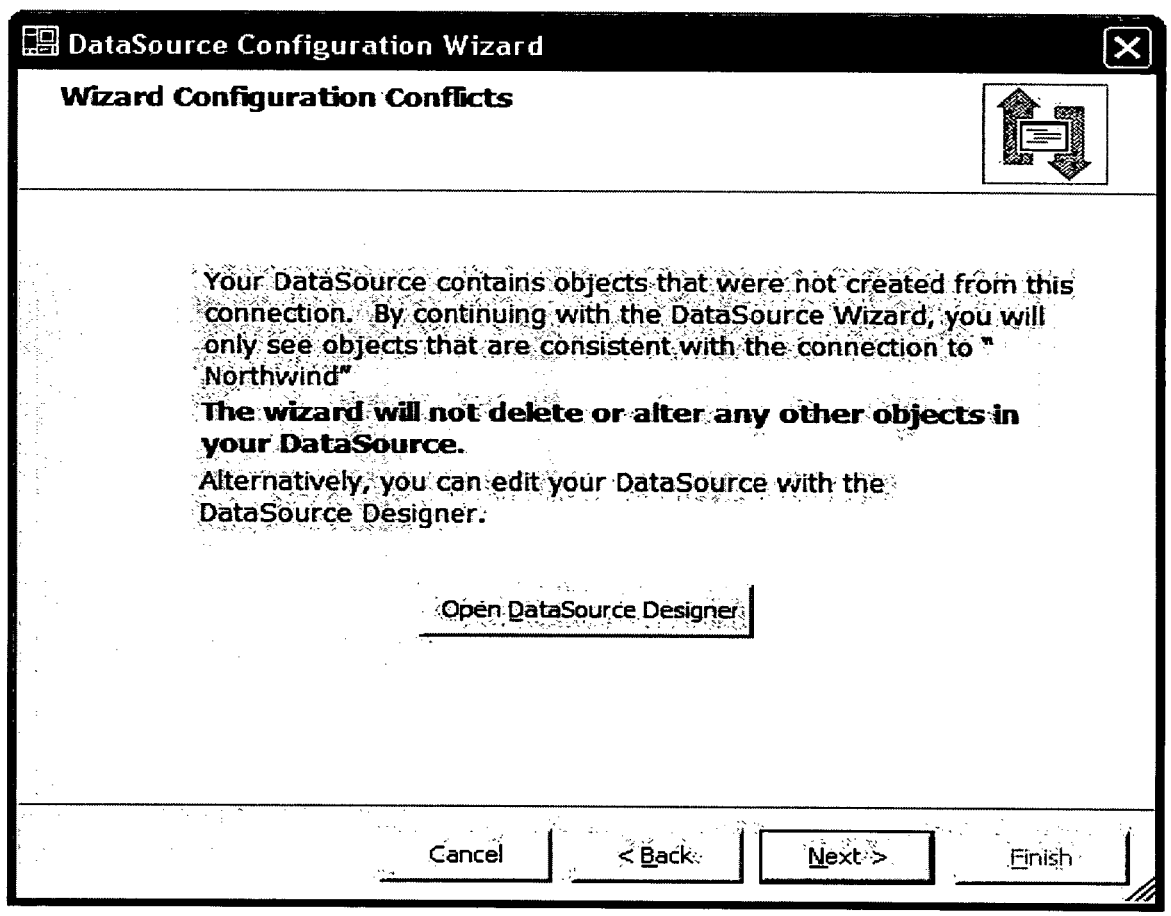
FIG. 8 is a diagram of an exemplary user interface in accordance with an aspect of the subject invention.

Turning to FIG. 8, an exemplary user interface 800 in accordance with an aspect of the subject invention is illustrated. The user interface 800 can be employed, for example, when a project's data source contains objects that were not created with the system 100. For example, if objects exist that can not be displayed in the designer, the system 100 (e.g., wizard) can inform the user and provide them a button to go to the Data source designer directly. Pressing this button will cancel the system 100 (e.g., wizard) and open the Data source Designer for the Data source the user had selected to configure.

Figure 9:
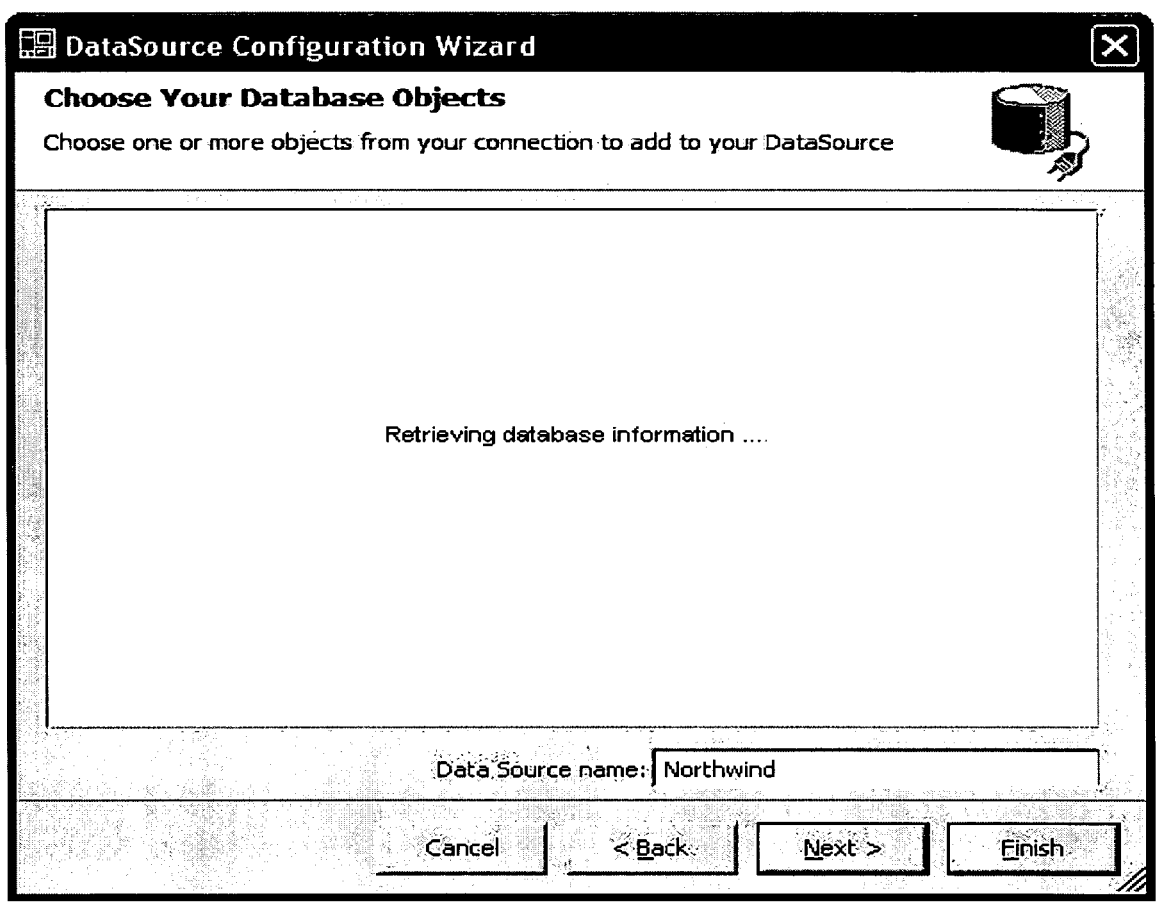
FIG. 9 is a diagram of an exemplary user interface in accordance with an aspect of the subject invention.

Once a valid connection has been established the database schema discovery process is initiated. In one example, this work occurs in a new thread as performance may be an issue and the user may desire to watch the searching status and hit the Cancel button at any time. Referring to FIG. 9, an exemplary user interface 900 can be displayed while the operation is processing.

Figure 10:
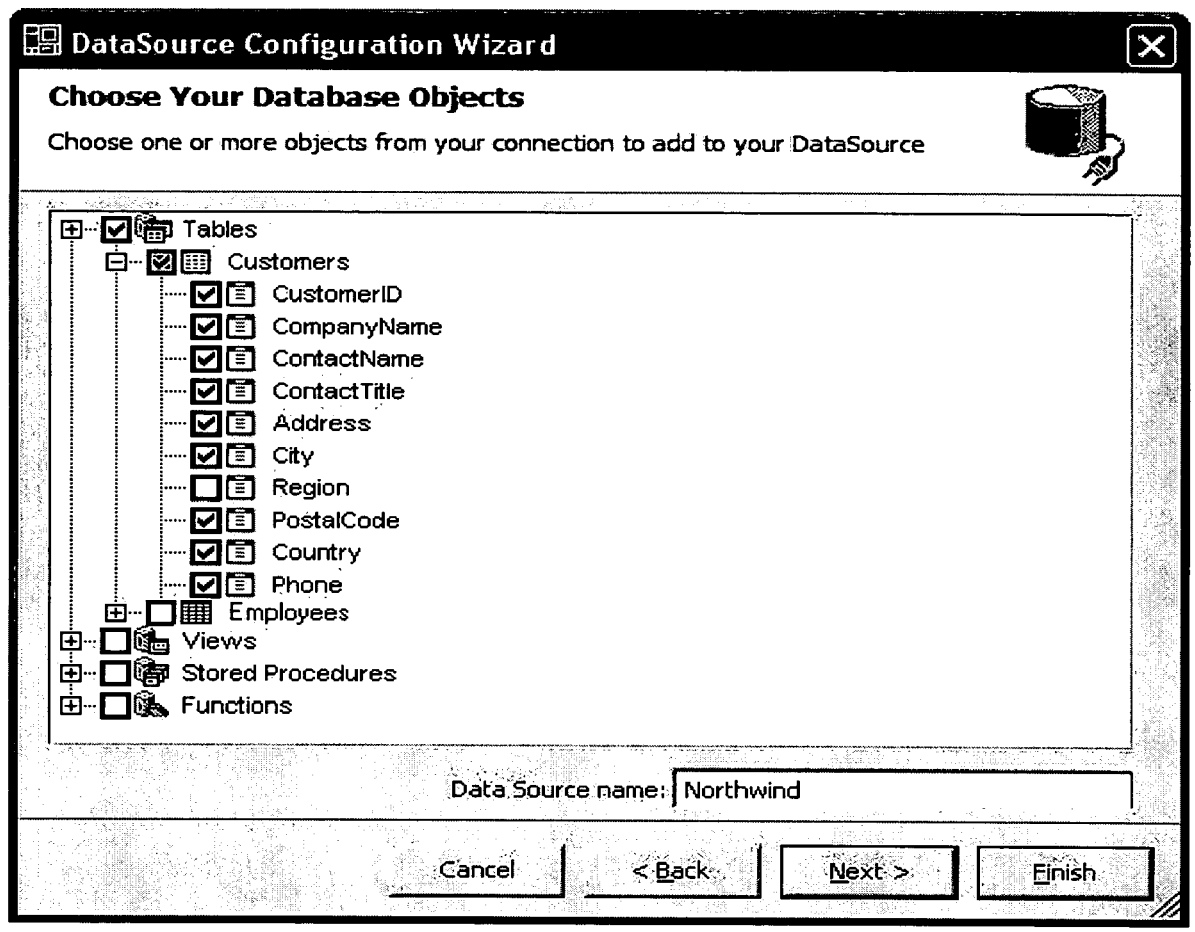
FIG. 10 is a diagram of an exemplary user interface in accordance with an aspect of the subject invention.

Referring next to FIG. 10, an exemplary user interface 1000 in accordance with an aspect of the subject invention is illustrated. In this example, a connection to the database 140 has succeeded. Additionally, the Customers table is displayed in Tri-State with a standard Table icon. Since the user has not selected all columns, the system 100 displays the tri-state indicating it's an incomplete selection. Since there are no errors, the system 100 displays the standard table icon.

Figure 11:
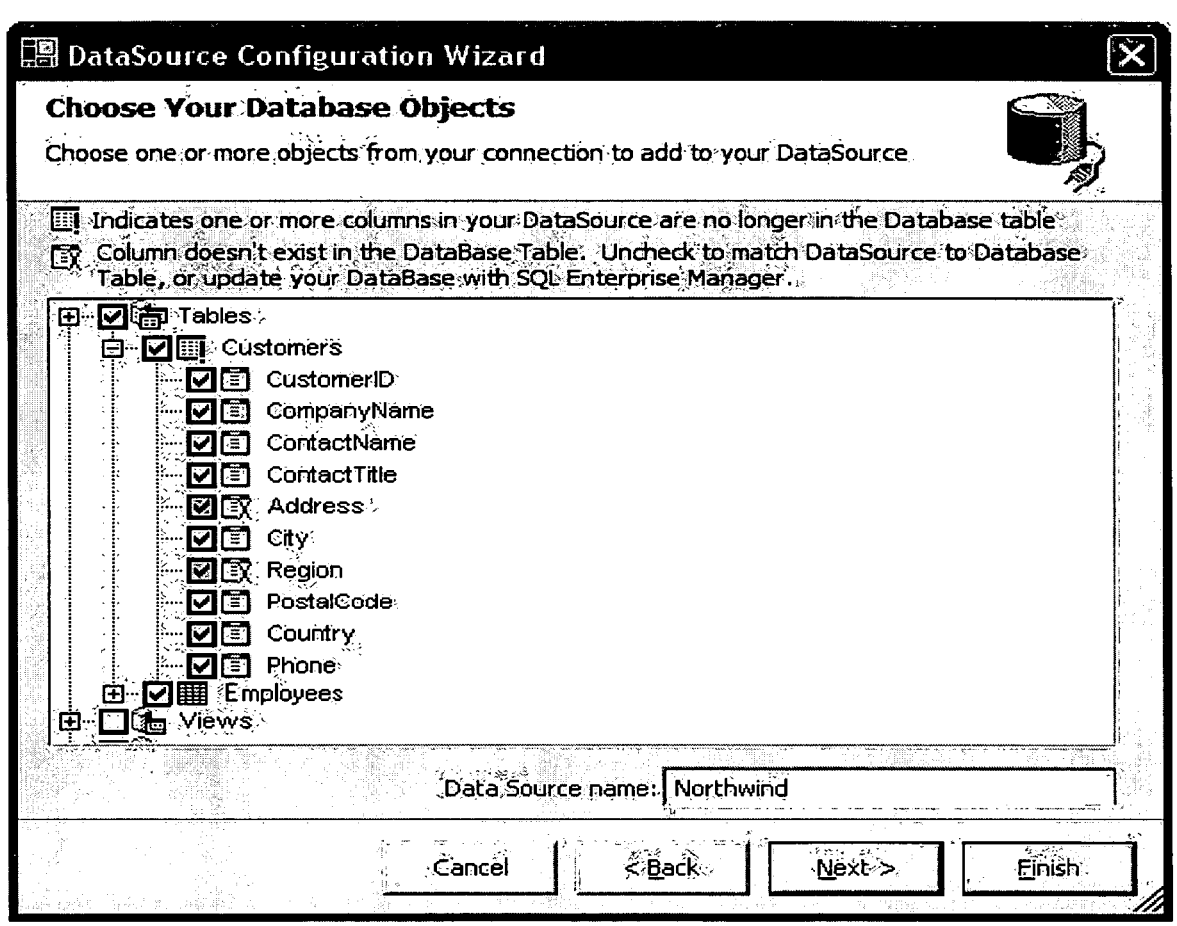
FIG. 11 is a diagram of an exemplary user interface representing a conflict situation found in accordance with an aspect of the subject invention.

Turning to FIG. 11, an exemplary user interface 1100 representing a conflict situation found in accordance with an aspect of the subject invention is illustrated. In this example, the system 100 shows Customers as checked, but with a Table Warning Icon. All columns are selected, even though there are some errors. The Table Warning Icon indicates to the user there is a problem below. If the Customers node was collapsed, (the default), the user would need feedback to look below as there are problems.

With respect to toggling of the tri-state, in one scenario, a user invokes the system 100 (e.g., opens the wizard) and selects 4 of the 5 columns available on the customers table. At this point, the Customer Table has a checkbox of Tri-State since some of the columns are selected but not all. If the user individually selects all the columns, the Customers table checkbox changes to "checked". In the same above scenario, if the user checks a Tri-State table checkbox, the next state should be fully checked, in which case all columns are checked. If the user checks the table "customer" again, it goes to unchecked.

In this example, toggling the checkbox of a table and/or column does not change the warning icon that may be displayed next to the table or column. Since no changes are committed by the system 100 until the final step (e.g., of the wizard), the table and/or column is still missing. Only once the user commits their changes with the final step, will the actual values be changed. If the user re-enters the system 100 (e.g., wizard) after removing a column that didn't exist, the column and missing icon would no longer appear. At the same time, if the column was added to the database table, the missing column icon would no longer appear.

As noted previously, the system 100 can employ icons to communicate comparison information to a user, based, for example on the information in Table 1:

TABLE 1

| | |
|---|---|
| table missing icon | Database table doesn't exist on the connection. |
| table warning icon | Database table refers to columns that do not exist on the underlying database object |
| column missing icon | Column doesn't exist in the underlying database table. |

In one example, when the system 100 loads a tree view control, the following rules are employed:

TABLE 2

| Category | Node Level | Actions |
|---|---|---|
| Tables | 0 | User can check a table to consume this table in the Data source |
| List of tables | 1 | User can check each table to select all fields in the given table |
| Columns of each Table | 2 | Use can check/uncheck individual columns to construct the query |
| Views | 0 | Same as tables |
| List of Views | 1 | Same as List of Tables |
| Columns of each View | 2 | Same as Columns of each Table |
| Stored Procedures | 0 | Same as Tables |
| List of Stored Procedures | 1 | Same as List of Tables |
| Columns of each Stored Procedure | 2 | This is slightly different the views or tables. The stored procedure will be executed, and will return all columns. However, the user can uncheck the columns they wish to represent as a typed database table. The stored procedure will still return the columns, but any column not checked will only be available via DataTable.Rows(x).Columns("SomeColumn") |
| Functions | 0 | Same as Tables |
| List of Functions | 1 | Same as Tables |
| Columns of each Function | 2 | Same as Columns of each Stored Procedure |

In another example, when filling the tree view with the objects the system 100's already consumed, there are some rules for displaying various scenarios that may exist. Comparison are be made between objects available on a given connection and the TableMappings within each DataTable. For the purposes of displaying consumption of a given table, stored procedure, view and/or function, in this example, no evaluation is made against any of the queries on the DataTables. For example:

TABLE 3

| Scenario | Result |
| --- | --- |
| DataTable is mapped, using TableMappings, to a source object that is not currently available on the connection. | Table is displayed and marked with data table missing icon. All columns in the DataTableMappings collection are displayed with Column Missing Icon |
| DataTable TableMappings has a Source and Destination TableMapping that changes the TableName. For example, Database has a table named Customers -- TableMappings maps this to Users. | When using DataTableMappings, the Source Table is used for comparison to the database. The Customers table is displayed. If the Source and Destination tables are different, the mapped column is displayed next to the table, in parentheses, in italics. In one example, if the user hovers over the node, the user gets a tool tip with the following text. If the node has more then one description to be displayed in the tool tip, the tool time can concatenate each item. Such as when the table is mapped, but doesn't exist on the connection. |
| DataTable TableMappings has a matching table on the connection, however, there are ColumnMappings that do not exist on the Connection.Table. | Table is displayed with a table warning icon and each column that is missing is displayed with a Column Missing Icon. |
| DataTable TableMappings has column mappings. | The tree view displays the column as it appears in the Database with parentheses and italic text showing the mapped name. If the node has more then one description to be displayed in the tool tip, the tool time can concatenate each item. Such as when the column is mapped, but doesn't exist on the Table. |

Referring to FIG. 12, an exemplary user interface 1200 in accordance with an aspect of the subject invention is illustrated. In this example, as discussed in Table 3, the DataTable TableMappings has a Source and Destination TableMapping that changes the TableName. For example, Database has a table named Customers which TableMappings maps to Users.

Next, turning to FIG. 13, an exemplary user interface 1300 in accordance with an aspect of the subject invention is illustrated. In this example, again as discussed in Table 3, the tree view displays the column as it appears in the Database with parentheses and italic text showing the mapped name (e.g., column CompanyName is mapped to Company in the database).

Referring to FIGS. 14, 15 and 16, an exemplary database view 1400, data source view 1500 and tree view 1600 in accordance with an aspect of the subject invention is illustrated. In the following example, the Data source 1500 was created when the database had a column named "State". When the application was moved from prototype to production, the database administrator changed the "State" column to "Region". The developer is employing the system 100 to update the developer's application.

Tree view 1600 displays Customers with a table warning icon as there are issues with the columns below the node and further displays a Tri-State checkbox to indicate that there are items checked, but not all. In the tree view 1600, region is unchecked because it's available as a field on the Customers table but not included in the Data source DataTable. Additionally, state is given a column missing icon as the column doesn't exist on the underlying database. It has a tri-state checkbox as it exists within the entity that was originally the Customers DataTable, but doesn't exist on the underlying Database Table.

In this example, comparison information is displayed by the system 100 with both tri-state checkbox and an icon. The tree view 1600 is a view of the database 1400 and is not generally meant to be a view of the data source 1500. So, in this case having the column checked would denote that it does exist in the DataTable, and it's consumed in the DataTable. Having it unchecked would not provide the ability remove the column from the DataTable.

Additionally, in this example, the state column is shown in tree view 1600 to support the scenario where a user just wants to remove a column from the database table.

In accordance with an aspect of the subject invention, for each object that was "touched" by the system 100, the system 100 will to validate the object, and all the queries on that object. In one example, if the data source includes objects that are marked as problematic, (e.g., column missing, table missing etc.), and the user didn't "touch" the object, these object (s) will not be validated by the system 100.

Figure 17:
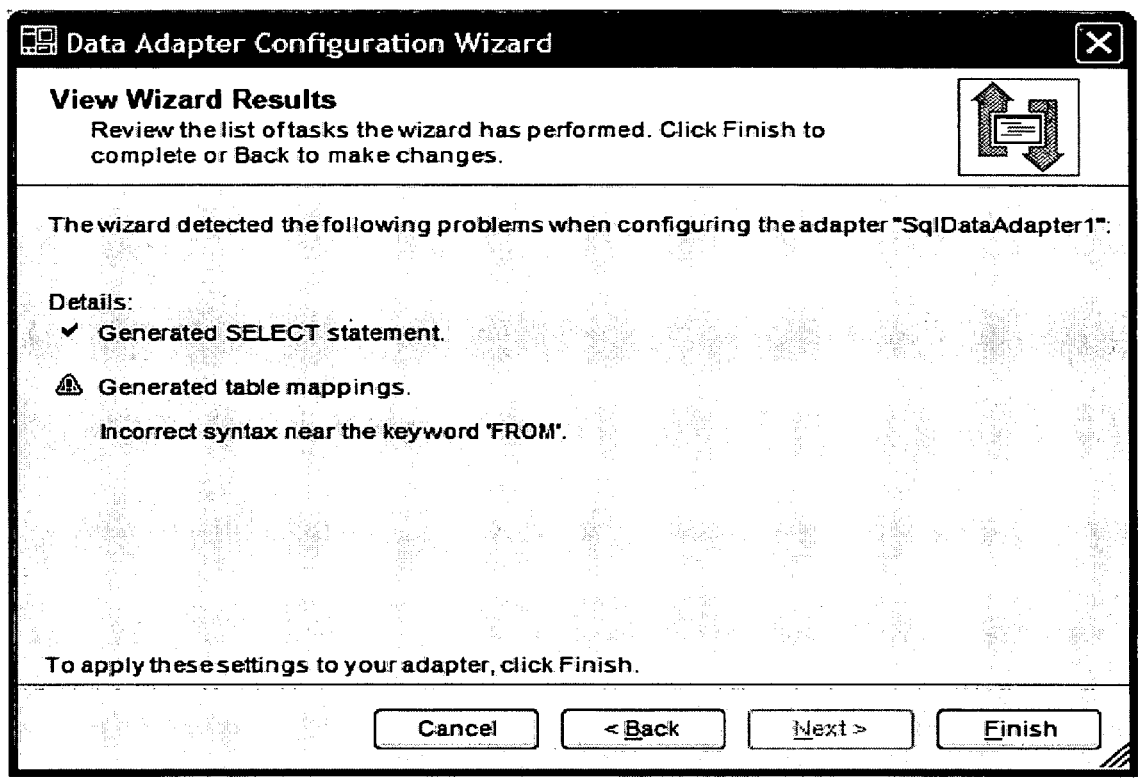
FIG. 17 is a diagram of an exemplary user interface in accordance with an aspect of the subject invention.

Referring to FIG. 17, an exemplary user interface 1700 in accordance with an aspect of the subject invention is illustrated. In this example, validation has failed by the system 100. In this example, the user is prompted of the failure of validation.

Figure 18:
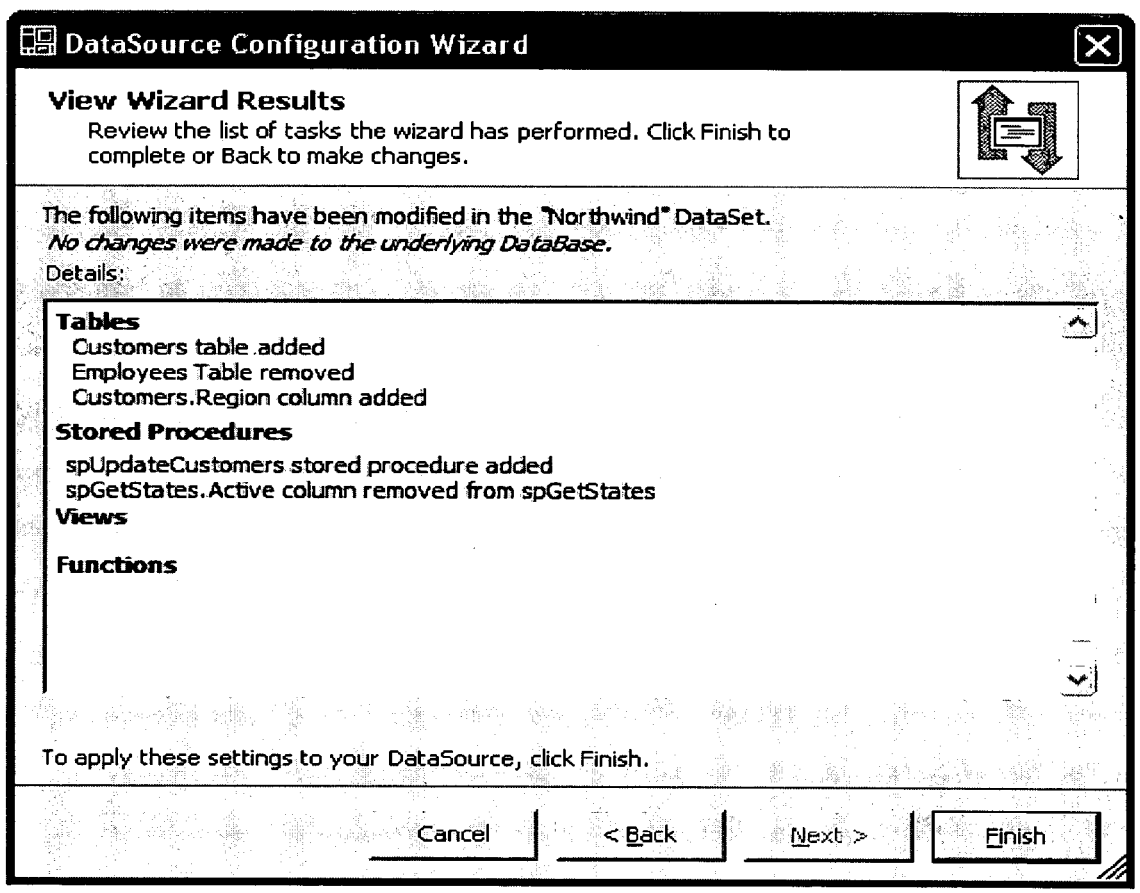
FIG. 18 is a diagram of an exemplary user interface in accordance with an aspect of the subject invention.

Next, turning to FIG. 18, an exemplary user interface 1800 in accordance with an aspect of the subject invention is illustrated. In this example, the system 100 provides information regarding change(s) that occurred as a result of invocation of the system 100 (e.g., wizard. For example:

List of tables, stored procedures, functions, views added

List of tables, stored procedures, functions, views removed

Columns that have been added or removed from the above

The user interface 1800 shows the results of the changes, after they've been made. The user can press cancel, in which case the system 100 reverts back the changes made.

It is to be appreciated that the system 100, comparison component 110, the display component 120, the dataset 130, the database 140 and/or the input component 150 can be computer components as that term is defined herein.

While the subject invention has been described with respect to comparison of a Dataset with an associated database, those skilled in the art will recognize that the subject invention can be employed with respect to comparison of any suitable schema for an application against a data source. For example, a schema can be based upon XML file(s), object hierarchies, etc. Thus, it is to be appreciated that any type of suitable schema can be employed and all such types of schema are intended to fall within the scope of the hereto appended claims.

Figure 19:
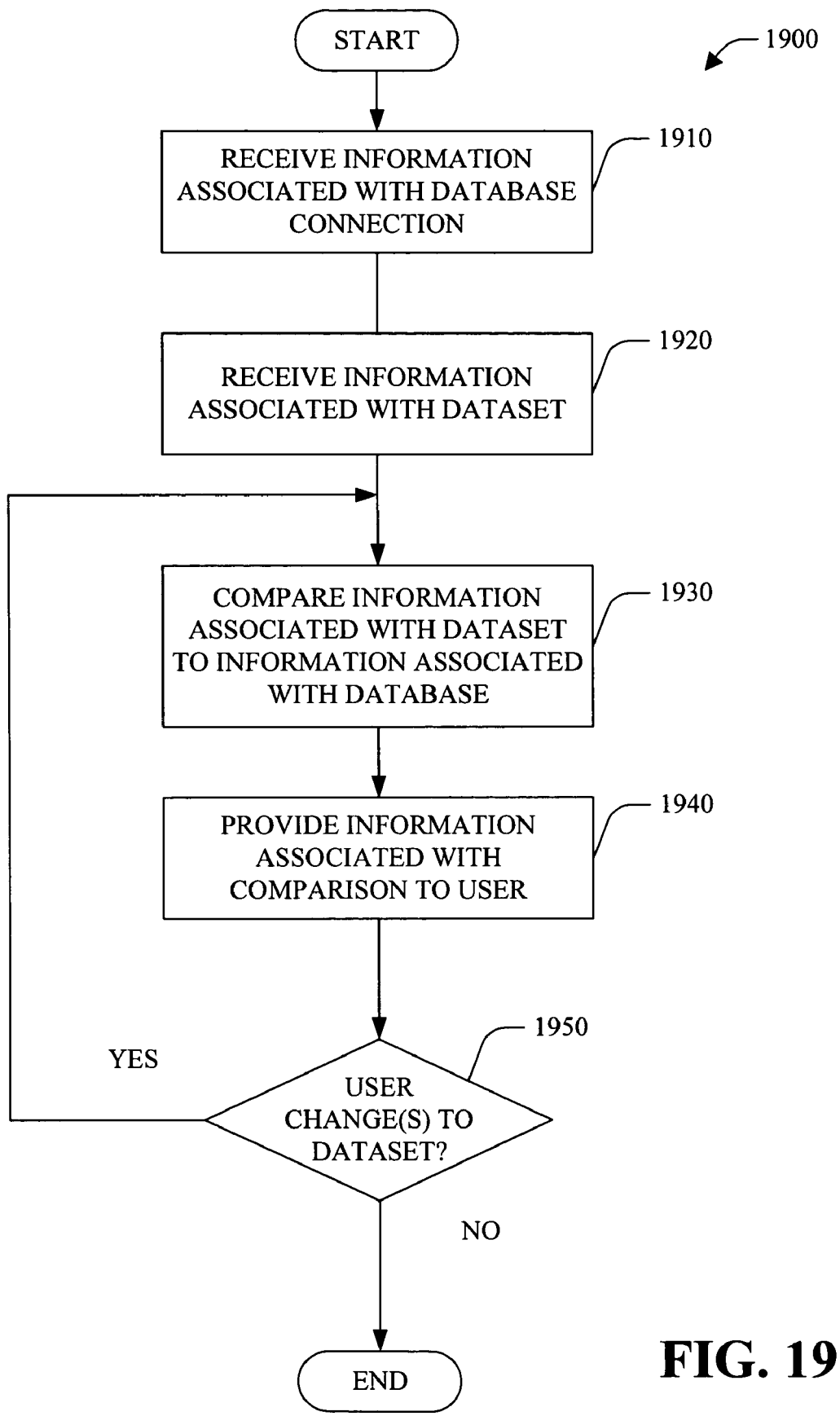
FIG. 19 is a flow chart of a method facilitating a reentrant database object wizard system in accordance with an aspect of the subject invention.

Turning briefly to FIG. 19, a methodology that may be implemented in accordance with the subject invention are illustrated. While, for purposes of simplicity of explanation, the methodology is shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodology in accordance with the subject invention.

The subject invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 19, a method facilitating a reentrant database object wizard in accordance with an aspect of the subject invention is illustrated. At 1910, information associated with a database connection is received (e.g., table(s), view(s), stored procedure(s) and/or function(s)). At 1920, information associated with a dataset is received.

At 1930, the information associated with the database connection is compared to the information associated with the dataset. At 1940, a user (e.g., developer) is provided with information regarding the comparison.

At 1950, a determination is made as to whether the user has made any change(s) to the dataset. If the determination at 1950 is YES, processing continues at 1930. If the determination at 1950 is NO, no further processing occurs.

Figure 20:
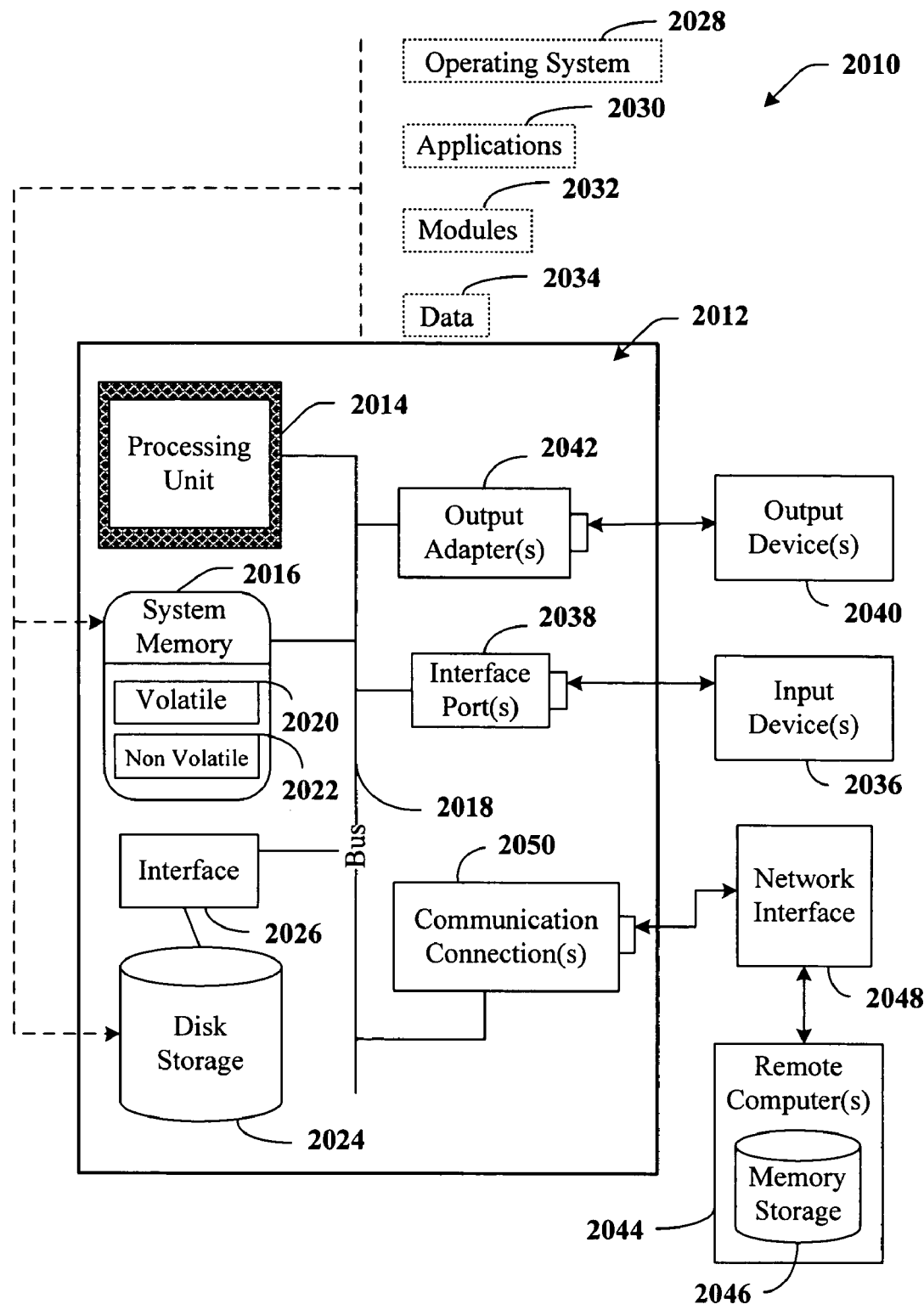
FIG. 20 illustrates an example operating environment in which the invention may function.

In order to provide additional context for various aspects of the subject invention, FIG. 20 and the following discussion are intended to provide a brief, general description of a suitable operating environment 2010 in which various aspects of the subject invention may be implemented. While the subject invention is described in the general context of computer-executable instructions, such as program modules, executed by one or more computers or other devices, those skilled in the art will recognize that the subject invention can also be implemented in combination with other program modules and/or as a combination of hardware and software. Generally, however, program modules include routines, programs, objects, components, data structures, etc. that perform particular tasks or implement particular data types. The operating environment 2010 is only one example of a suitable operating environment and is not intended to suggest any limitation as to the scope of use or functionality of the subject invention. Other well known computer systems, environments, and/or configurations that may be suitable for use with the subject invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 20, an exemplary environment 2010 for implementing various aspects of the subject invention includes a computer 2012. The computer 2012 includes a processing unit 2014, a system memory 2016, and a system bus 2018. The system bus 2018 couples system components including, but not limited to, the system memory 2016 to the processing unit 2014. The processing unit 2014 can be any of various available processors. Dual microprocessors and other multiprocessor architectures also can be employed as the processing unit 2014.

The system bus 2018 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 2016 includes volatile memory 2020 and nonvolatile memory 2022. The basic input/output system (BIOS), containing the basic routines to transfer information between elements within the computer 2012, such as during start-up, is stored in nonvolatile memory 2022. By way of illustration, and not limitation, nonvolatile memory 2022 can include read only memory (ROM), programmable ROM (PROM), electrically programmable ROM (EPROM), electrically erasable ROM (EEPROM), or flash memory. Volatile memory 2020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2012 also includes removable/nonremovable, volatile/nonvolatile computer storage media. FIG. 20 illustrates, for example a disk storage 2024. Disk storage 2024 includes, but is not limited to, devices like a magnetic disk drive, floppy disk drive, tape drive, Jaz drive, Zip drive, LS-100 drive, flash memory card, or memory stick. In addition, disk storage 2024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2024 to the system bus 2018, a removable or non-removable interface is typically used such as interface 2026.

It is to be appreciated that FIG. 20 describes software that acts as an intermediary between users and the basic computer resources described in suitable operating environment 2010. Such software includes an operating system 2028. Operating system 2028, which can be stored on disk storage 2024, acts to control and allocate resources of the computer system 2012. System applications 2030 take advantage of the management of resources by operating system 2028 through program modules 2032 and program data 2034 stored either in system memory 2016 or on disk storage 2024. It is to be appreciated that the subject invention can be implemented with various operating systems or combinations of operating systems.

A user enters commands or information into the computer 2012 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2014 through the system bus 2018 via interface port(s) 2038. Interface port(s) 2038 include, for example, a serial port, a parallel port, a game port, and a universal serial bus (USB). Output device(s) 2040 use some of the same type of ports as input device(s) 2036. Thus, for example, a USB port may be used to provide input to computer 2012, and to output information from computer 2012 to an output device 2040. Output adapter 2042 is provided to illustrate that there are some output devices 2040 like monitors, speakers, and printers among other output devices 2040 that require special adapters. The output adapters 2042 include, by way of illustration and not limitation, video and sound cards that provide a means of connection between the output device 2040 and the system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. The remote computer(s) 2044 can be a personal computer, a server, a router, a network PC, a workstation, a microprocessor based appliance, a peer device or other common network node and the like, and typically includes many or all of the elements described relative to computer 2012. For purposes of brevity, only a memory storage device 2046 is illustrated with remote computer(s) 2044. Remote computer(s) 2044 is logically connected to computer 2012 through a network interface 2048 and then physically connected via communication connection 2050. Network interface 2048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 2050 refers to the hardware/software employed to connect the network interface 2048 to the bus 2018. While communication connection 2050 is shown for illustrative clarity inside computer 2012, it can also be external to computer 2012. The hardware/software necessary for connection to the network interface 2048 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented reentrant database object wizard system, comprising:
   at least one processor that executes the following computer executable components stored on at least one computer readable storage medium:
   a comparison component that provides comparison information based upon a comparison of a current typed dataset of an application to an associated database, the comparison information includes objects of the typed dataset and the associated database that are common and objects that are not common between the typed dataset and the associated database;
   a display component that displays the comparison information to a user by displaying a dataset view, database view and a tree view, the tree view depicts TableMappings, the display component changes a connection context to the database between the comparison to compare the application between the current typed dataset and database, the display component employs a similar user interface for an initial phase and a reentrant phase of programming, and highlights one or more objects within the typed dataset that are no longer available in the database to facilitate conflict identification; and,
   an input component that receives user input that is a function of the comparison information, wherein the current typed dataset is modified based on the user input during the development cycle of the application, the modification includes at least one of adding or removing one or more objects in the dataset, wherein the one or more object include at least one of a stored procedure or function.

2. The system of claim 1, the comparison information comprising identification of at least one of a column or a table that is not common between the current typed dataset and the database.

3. The system of claim 1, further comprising cycling through the operations performed by the components of claim 1 to converge on a final dataset wherein the number of cycles is based in part on the user input.

4. The system of claim 3, the comparison component providing comparison information based upon a comparison of the modified dataset to the associated database.

5. The system of claim 4, the display component displays the comparison information based upon the comparison of the modified dataset to the associated database.

6. The system of claim 4, the display component displays information regarding a change that occurred as a result of a user.

7. The system of claim 6, the information displayed regarding the change comprising at least one of a list of tables, stored procedures, functions or views that were added.

8. The system of claim 6, the information displayed regarding the change comprising a column that was added to a table.

9. The system of claim 6, the information displayed regarding the change comprising at least one of a list tables, stored procedures, functions or views that were removed.

10. The system of claim 6, the information displayed regarding the change comprising a column that was removed from a table.

11. The system of claim 1, the comparison information displayed by the display component in a hierarchical view.

12. The system of claim 1, the comparison information displayed by the display component comprising a tri-state checkbox for an item, the tri-state checkbox toggles between an include state, an exclude state and a leave in current state.

13. A method facilitating a reentrant database object wizard comprising:
   employing at least one processor to execute computer executable instructions stored on at least one computer readable medium to perform the following acts:
   reentering a system during an application development cycle to compare information, similar user interface employed during initializing the system and reentering the system;
   comparing information associated with a dataset to information associated with a database;
   changing a connection context to the database between the comparison to compare the application between dataset and database;
   providing information associated with the comparison to a user by displaying a dataset view, database view and a tree view, the tree view depicts TableMappings, wherein the information includes objects of the dataset and the database that are common and objects that are not common between the dataset and the database;

highlighting one or more objects within the dataset that are no longer available in the database to facilitate identification of a conflict;

modifying the dataset based on the user's input, the user's input a function of the information provided to the user, the modification includes at least one of adding or removing one or more objects in the dataset, wherein the one or more object include at least one of a stored procedure or function;

enabling the user to uncheck columns of a stored procedure of the dataset to represent the unchecked columns as a typed database table; and editing a database reference results in a project dataset file, the project dataset is immediately available for use in at least one of data binding, data sources window, user interface generation or in code intellisense.

14. The method of claim 13, further comprising:

determining whether the user has made a change to the dataset; and, if the user has made a change to the dataset, comparing information associated with the modified dataset to information associated with the database; and, providing information associated with the comparison to the user.

15. The method of claim 13, the information associated with the comparison comprising identification of at least one of a column or a table that is not common between the dataset and the database.

16. The method of claim 13, the comparison information displayed in a hierarchical view.

17. The method of claim 13, the comparison information displayed with a tri-state checkbox for an item, the tri-state checkbox toggles between an include state, an exclude state and a leave in current state.

18. A computer readable storage medium storing computer executable components of a reentrant database object wizard system comprising:

at least one processor that executes the following computer executable components stored on at least one computer readable storage medium:

a comparison component that provides comparison information based upon a comparison of a dataset to an associated database, the comparison information includes objects of the dataset and the associated database that are common and objects that are not common between the dataset and the associated database;

a display component that displays the comparison information to a user by displaying a dataset view, database view and a tree view, the tree view depicts TableMappings, the display component changes a connection context to the database between the comparison to compare the application between dataset and database, the display component employs a similar user interface for an initial phase and a reentrant phase, and facilitates identification of conflicts by highlighting one or more objects within the dataset that are no longer available in the associated database; and, an input component that receives user input based at least in part on the comparison information, wherein the dataset is modified based on the user input during an application development cycle, the modification includes at least one of adding or removing one or more objects in the dataset, wherein the one or more object include at least one of a stored procedure or function.

19. A reentrant database object wizard system comprising:

at least one processor;

at least one computer readable storage medium storing computer executable instructions that when executed by the at least one processor implement components comprising:

means for reentering a system during an application development cycle to compare information, a similar user interface for an initial phase and a reentrant phase is provided to a user;

means for comparing a dataset to an associated database;

means for displaying information associated with comparison of the dataset to the associated database, by displaying a dataset view, database view and a tree view, the tree view depicts TableMappings, the information includes objects that are common between the dataset and the associated database and objects that are not common between the dataset and the associated database;

means for highlighting one or more objects within the dataset that are no longer available in the associated database to facilitate identification of conflicts;

means for changing a connection context to the database between the comparison to compare the application between dataset and database; and, means for receiving a user input based at least in part on the comparison information to modify the dataset to resolve the identified conflicts, the modification includes at least one of adding or removing one or more objects in the dataset, wherein the one or more object include at least one of a stored procedure or function.

* * * * *